United States Patent

Nose et al.

[11] Patent Number: 5,806,987
[45] Date of Patent: Sep. 15, 1998

[54] HYDRODYNAMIC BEARING APPARATUS

[75] Inventors: Tamotsu Nose; Masato Gomyo; Masamichi Hayakawa; Hideki Kanebako, all of Nagano, Japan

[73] Assignee: Sankyo Seiki Mfg. Co., Ltd., Nagano-ken, Japan

[21] Appl. No.: 796,805

[22] Filed: Feb. 6, 1997

[30] Foreign Application Priority Data

| Feb. 7, 1996 | [JP] | Japan | 8-045497 |
| Feb. 7, 1996 | [JP] | Japan | 8-045498 |
| Aug. 29, 1996 | [JP] | Japan | 8-247174 |

[51] Int. Cl.$^6$ .................................. F16C 32/06
[52] U.S. Cl. .................. 384/100; 384/119; 384/107; 384/132
[58] Field of Search ...................... 384/100, 107, 384/111, 112, 113, 114, 118, 119, 121, 123, 124, 132

[56] References Cited

U.S. PATENT DOCUMENTS

| 4,795,275 | 1/1989 | Titcomb et al. | 384/107 |
| 5,423,612 | 6/1995 | Zang et al. | 384/119 |
| 5,427,456 | 6/1995 | Hensel | 384/112 |
| 5,433,529 | 7/1995 | Hensel | 384/119 X |
| 5,516,212 | 5/1996 | Titcomb | 384/112 |
| 5,533,811 | 7/1996 | Polch et al. | 384/107 |

FOREIGN PATENT DOCUMENTS

6-178492  6/1994  Japan.

*Primary Examiner*—Thomas R. Hannon
*Attorney, Agent, or Firm*—McAulay Fisher Nissen Goldberg & Kiel, LLP

[57] ABSTRACT

A hydrodynamic bearing apparatus which includes at least two hydrodynamic bearing sections for rotatably supporting a shaft member and a cylindrical member, where the bearing sections constitute a continuous bearing clearance. A hydrodynamic pressure generating portion is provided for generating a hydrodynamic pressure in a lubricant which is filled in the bearing clearance. One hydrodynamic generating portion is shaped asymmetrically to move the lubricant in one direction. Two capillary sealing sections are also provided. One capillary sealing section is positioned downstream in a moving direction of the lubricant and is configured such that the lubricant moves by a predetermined amount to cancel a differential pressure which is generated at the hydrodynamic bearing sections.

26 Claims, 8 Drawing Sheets

HYDRODYNAMIC BEARING APPARATUS

BACKGROUND OF THE INVENTION a) Field of the Invention

This invention relates to a hydrodynamic bearing apparatus in which a hydrodynamic pressure is generated in a lubricant interposed in a bearing clearance, and a rotary member is supported with respect to a fixed member thereby.

b) Description of the Related Art

In recent years, in various apparatus such as motors, various hydrodynamic bearing apparatus that use a hydrodynamic pressure generated in a lubricant such as an oil have been studied and suggested to meet the demand for high rates of rotation in particular. In a hydrodynamic bearing apparatus, a hydrodynamic surface on a fixed member side and that on a rotary member side face each other; hydrodynamic pressure generating grooves are formed on at least one of the facing hydrodynamic surfaces; a predetermined lubricant such as an oil interposed between the facing surfaces of the rotary member and the fixed member is pressurized by a pumping action of hydrodynamic pressure generating grooves during the rotation of the rotary member, to support the rotation of the rotary member by the hydrodynamic pressure of the lubricant.

As described, a hydrodynamic bearing apparatus has a lubricant such as an oil (hereafter simply called a lubricant) in a bearing section, and generally can be classified in the following three types based on the structure for retaining the lubricant.

(1) Partial lubricant filling structure (See Tokkai H6-178492, for example)

This is the most simple hydrodynamic bearing structure in which a lubricant is filled only in the bearing section, and an air layer is formed in the bearing space.

(2) Lubricant circulating structure (See U.S. Pat. No. 4,795,275, for example)

This is a structure in which the lubricant is also filled in the space between the bearing sections, and both ends of the bearing space are in communication by virtue of a circulating hole, wherein the lubricant is circulated so that internal pressure differences (differential pressure) generated during rotation are canceled. With this structure, it is possible to maintain a sufficient amount of the lubricant to prolong the usable life of the bearing and to advantageously prevent the lubricant from leaking externally since the internal pressure differences (differential pressure) of the lubricant are always canceled by the circulating hole.

(3) One side recession retaining structure (See U.S. Pat. No. 5,427,456, for example)

This structure is made by forming a recessed bearing clearance by closing axially one end of the bearing section with a wall, and by creating only one outlet where the bearing clearance communicates with air, wherein any pressure differences generated in the lubricant are sustained by the one-side recessed retaining structure. According to this structure, since the lubricant can be prevented from moving, it is possible to obtain an inexpensive hydrodynamic bearing structure, prolonging usable life and preventing lubricant leakage.

However, each of the above mentioned conventional hydrodynamic bearing structures has certain problems. With the "partial lubricant filling structure" of (1), it is difficult to control the injected amount of lubricant, and the absolute amount of lubricant is small due to the small space in the bearing section, shortening the absolute usable life. In addition, if the lubricant amount is increased by widening the filling space for the lubricant to cancel the above problem, the lubricant would easily leak. Further, since the volume of the air layer in the bearing increases and decreases due to changes in atmospheric pressure and temperature, it is easy for the lubricant to move and leak; therefore, it is required to provide a countermeasure for its prevention by providing a hole communicating with the outside and the like.

With the "lubricant circulating structure" of (2), the structure became complicated due to the circulating hole, providing poor productivity and expensive manufacturing cost.

With the "one side recession retaining structure" of (3), as a result of providing a one-side recessed bearing section, the shaft member is limited to a structure for retention of lubricant no matter which bearing structure is used, a shaft rotation type or a shaft fixed type, and therefore, the usage is limited.

OBJECT AND SUMMARY OF THE INVENTION

For these reasons, this invention aims to provide a hydrodynamic bearing apparatus of wide applicability which has a simple and inexpensive structure, prevents the lubricant from leaking, and prolongs the usable life of the bearing.

In order to achieve the above objectives, points are listed in accordance with the invention which are necessary to satisfy (1) the condition for preventing lubricant from leaking, (2) the condition for enabling a long usable life, and (3) the condition for manufacturing a radial hydrodynamic bearing at low cost and excellent productivity. (1) The condition for preventing lubricant from leaking:

In order to prevent lubricant from leaking, it is necessary that the interface of the lubricant is within a small space between a fixed member and a rotary member.

This condition should be satisfied not only when the apparatus is rotating or stopped, but also when the temperature and atmospheric pressure are changed, when the apparatus is in any position, when vibration or impact is added, and when the amount of the lubricant is varied due to variations in its injection amount and due to evaporation.

In particular, if a large inertial force is added to a hydrodynamic bearing, it is difficult to retain the lubricant only with a sealing force of a capillary or magnetic type. In this case, it is necessary to use the hydrodynamic pressure generated by a fluid viscous drag of the lubricant as the lubricant retaining force. It is also necessary to narrow the space, in which the interface of the lubricant is positioned, smaller than a predetermined space to enlarge the hydrodynamic pressure by the fluid viscous drag of the lubricant.

Further, in order to position the interface of the lubricant within the narrow space as described above, it is necessary that a. the interface position and amount of the lubricant do not vary no matter what condition the apparatus is in;

b. the interface position can be controlled during injection of the lubricant so that it can be easily positioned within a designated portion; and c. an extra capacity to some extent is provided at areas before and after the designated interface location in the narrow space.

Another condition to prevent lubricant from leaking outside is that the capillary sealing force sometimes can be used when the apparatus is stopped. In other words, it is necessary that a pull-back force by capillary action continuously acts as a force to maintain the lubricant at a predetermined position inside the bearing.

In order to prevent lubricant from leaking outside, it is also necessary that the inner differential pressure of the lubricant is canceled during rotation, being balanced.

That is, the differential pressure, generated in the lubricant due to hydrodynamic pressure or centrifugal force generated during rotation, becomes much larger than the sealing pressure in general; for example, if the pressure is different between two exits, the lubricant moves until the pressure difference is canceled, by which external leakage is sometimes caused. In other words, in order to prevent the lubricant from leaking externally, it is necessary to construct the apparatus in which the above mentioned pressure difference is canceled with a small amount of the lubricant moving to balance it, or in which the pressure difference is sustained such as in a one-bag holder structure.

(2) The condition to prolong the usable life:

It is necessary to retain extra lubricant, i.e., several times more than the lubricant filled in the bearing section, to prolong the usable life because a chemical change is caused due to abrasion particles mixed into the lubricant by the use of the bearing, and evaporation and leakage are caused to a certain degree by material and other conditions, causing the deterioration and loss of the lubricant. For this reason, the usable life of the hydrodynamic bearing is measured by these standards: how much extra lubricant can be retained inside and how much loss of the lubricant caused by evaporation and leakage can be reduced.

(3) The condition to manufacture the apparatus with low cost and excellent productivity.

In order to achieve this, it is important to construct the apparatus as simple as possible.

Following consideration of the above, in a hydrodynamic bearing apparatus of this invention, the interface of the lubricant is positioned within a capillary sealing section formed of a narrow space between a fixed member and a rotary member, or a space between a shaft member and a cylindrical member whose surface facing the shaft member is in a cylindrical shape; the capillary sealing force always acts when the apparatus is stopped; and a pull-back force according to the capillary sealing force maintains the lubricant at an internal predetermined position. When a large inertial force is added, a hydrodynamic pressure due to fluid viscous drag of the lubricant is generated at the capillary sealing section formed of the narrow space, and the lubricant is prevented form dispersing outside thereby. During rotation, a differential pressure is intentionally generated in the lubricant at the hydrodynamic bearing section, and the lubricant moves slightly so as to cancel the differential pressure in the lubricant and to maintain a balanced condition. If the differential pressure in the lubricant is intentionally generated at the hydrodynamic bearing section as described above, the lubricant is moved by the differential pressure based on errors in manufacturing, thus preventing the lubricant from dispersing externally which is normally caused by unexpected movement of the lubricant. Moreover, the space capacity of the capillary sealing section downstream in the moving direction of the lubricant is set to a capacity which tolerates the displacement due to the lubricant moving, i.e., the increased amount, and the lubricant can be prevented from leaking.

DESCRIPTION OF THE PREFERRED EMBODIMENTS

Embodiments are described in detail in which this invention is applied to a so-called both-end-fixed journal type HDD spindle motor referring to the drawings.

Figure 1:
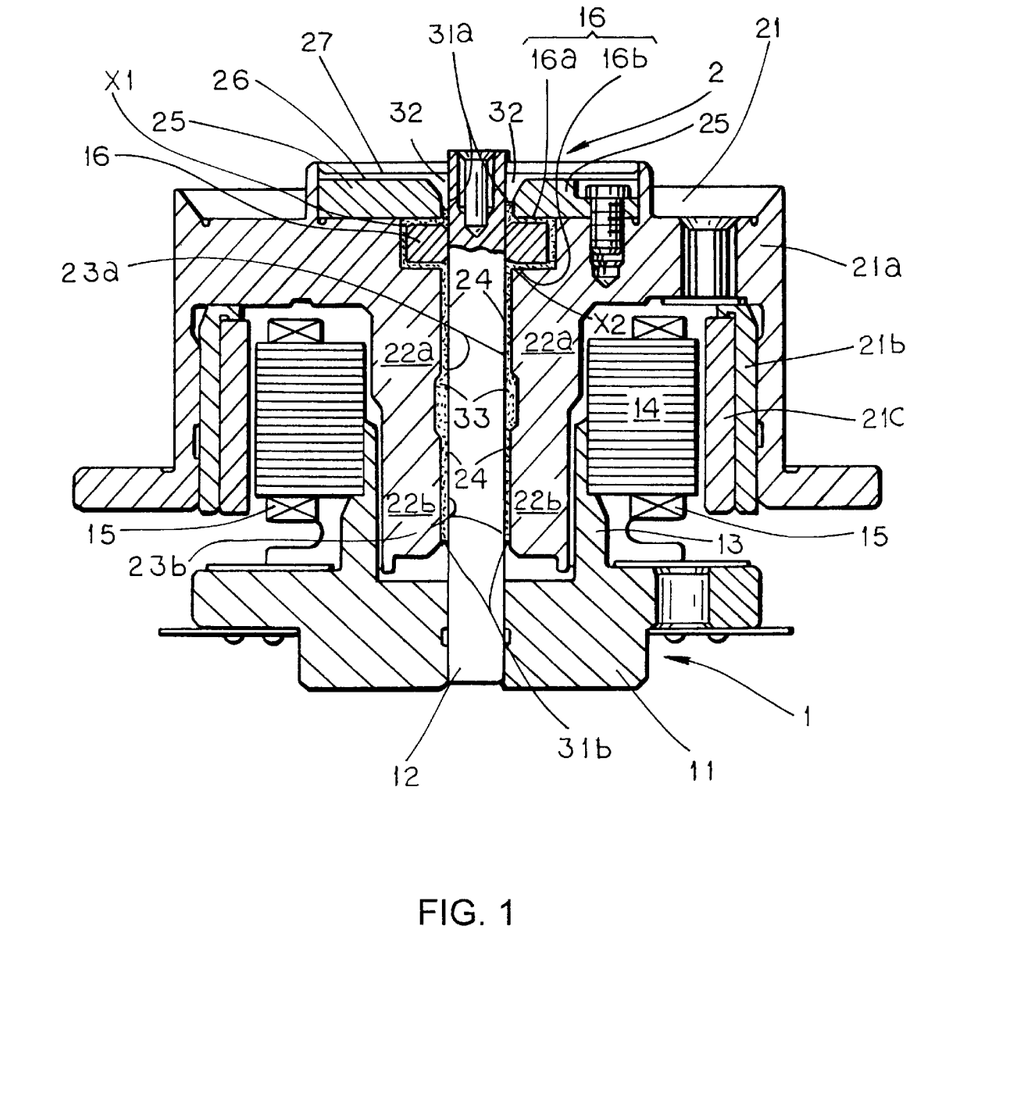
FIG. 1 is a descriptive cross section showing one example of a HDD spindle motor having a hydrodynamic bearing apparatus of one embodiment of this invention.

First, an overall structure of an HDD spindle motor shown in FIG. 1 is described. The HDD spindle motor comprises a stator assembly 1 (a fixed member) and a rotor assembly 2 (a rotary member) mounted to the stator assembly 1 from the top in the figure. The stator assembly 1 has frame 11 screwed onto a fixed base of a hard disk drive (HDD) (not illustrated), and a journal (a shaft member) standing in the center of the frame 11 extends upwardly in the figure. The tip end (the upper end in the figure) of the journal 12 is screwed onto an upper fixed base of the hard disk drive (HDD) (not illustrated) to make it a so-called both-end-fixed journal type.

The frame 11 has a hollow cylindrical supporting holder 13; a stator core 14 is fitted to the outer circumference of the supporting holder 13; a coil 15 is wound around salient-pole of the stator core 14.

The rotor assembly 2 has a hub 21 for supporting a magnetic recording medium such as a magnetic disk (not illustrated), which is a cylindrical member whose surface facing the journal 12 is in a cylindrical shape, and rotatably supported to the outer circle side of the journal 12 via a pair of radial hydrodynamic bearing sections 22a and 22b.

The hub 21 has a cylindrical frame section 21a, and a magnetic recording medium is mounted to the outer circle thereof. An annular drive magnet 21c is mounted to the inner circle of the frame section 21a via a back yoke 21b. The drive magnet 21c is arranged such that it closely faces the salient-pole outer circle edge of the salient pole of the stator core 14 mentioned before.

Figure 2:
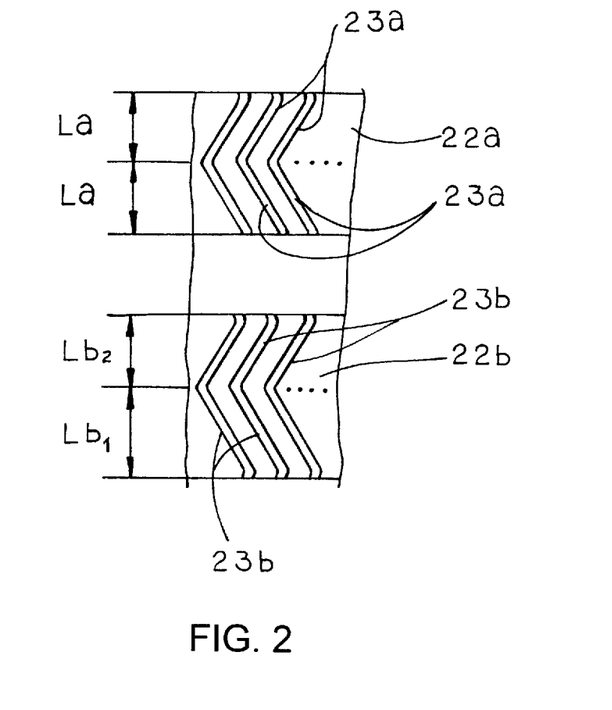
FIG. 2 is a development elevation of one example of radial hydrodynamic pressure generating grooves in the embodiment of FIG. 1.

In this invention, the pair of radial hydrodynamic bearing sections 22a and 22b are formed directly on the inner circle of the hub 21, and are axially arranged by a predetermined space. Inner circle surfaces of the radial hydrodynamic bearing sections 22a and 22b and the outer circle surface of the journal 12 constituting bearing surfaces are arranged opposite each other via a space of several $\mu$m to form the pair of radial hydrodynamic bearing sections 22a and 22b. On at least one of the facing surfaces of the pair of radial hydrodynamic bearing sections 22a and 22b and of the journal 12, herringbone-configured radial hydrodynamic pressure generating grooves 23a and 23b as shown in FIG. 2 are grooved such that they are annularly in parallel, and a predetermined lubricant 24 made of an oil, magnetic fluid, and the like is interposed between both facing surfaces; the lubricant 24 is pressured up to generate a hydrodynamic pressure by a pumping action caused by the radial hydrodynamic pressure generating grooves 23a, 23b when the hub 21 rotates, and the hub 21 is shaft-supported in a radial direction by the hydrodynamic pressure generated in the lubricant 24. The herringbone configuration of the radial hydrodynamic pressure generating grooves 23a and 23b will be described later.

As the lubricant 24 is used an oil composed of esterified trimethylolpropane (TMP) or pentaerythritol (PE) and a linear or branched fatty acid having $C_{5-18}$ to obtain both a usable life of the lubricant 24 and excellent bearing properties. In particular, it is preferable to use oil having an evaporation rate of $10^{-7}$ g/h • cm² (at 40° C.) or less and a viscosity of 30 cP (at 40° C.) or less.

Note that the injection of such lubricant 24 into the bearing may be performed using a capillary force or an external atmospheric pressure under a vacuumed condition after the motor completely assembled is temporarily put in a vacuum room. Consequently, it is possible to fill the inside of the bearing with the lubricant 24 with a low ratio of air-content.

Figure 4:
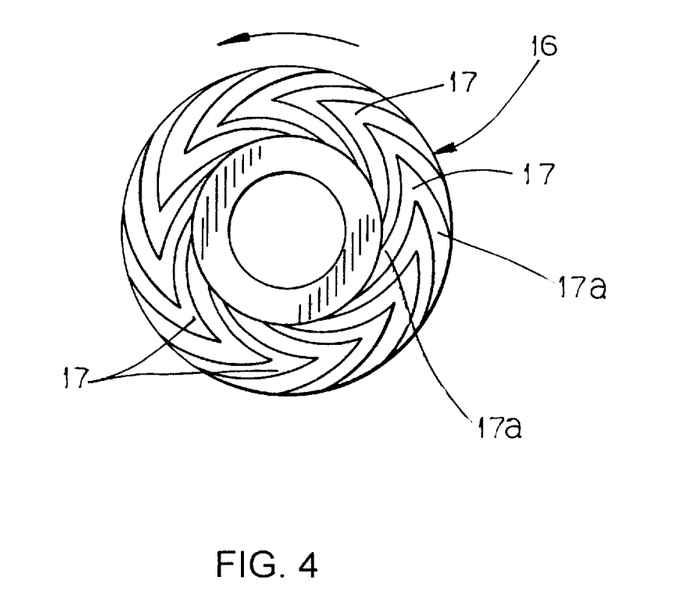
FIG. 4 is a plan view showing one example of thrust hydrodynamic pressure generating grooves in the embodiment of FIG. 1.

An annular thrust plate 16 constituting two thrust hydrodynamic bearing sections 16a and 16b is secured half way up the top end (the upper end in the figure) of the journal 12. The two thrust hydrodynamic bearing sections 16a and 16b constituted by the thrust plate 16 are arranged so that they are more adjacent to the upper end than the radial hydrodynamic bearing section 22a is. In other words, the bottom surface (in the figure) of the thrust plate 16 faces the side edge (the upper edge in the figure) of the radial hydrodynamic bearing section 22a arranged on the upper side, and the top surface of the thrust plate 16 faces the end surface of a thrust pressing plate 25 which is screwed onto the center area of the hub 21. On both axially side surfaces of the thrust plate 16 constituting the thrust hydrodynamic bearing sections 16a and 16b, herringbone-configured thrust hydrodynamic pressure generating grooves 17 as shown in FIG. 4 are annularly formed respectively.

The lubricant 24 continuous from the radial hydrodynamic bearing sections 22a and 22b is filled, without interruption, in the space between the facing surfaces of the thrust plate 16 and the upper surface of the hub 21 which constitutes the radial hydrodynamic bearing section 22a, and in the space between the facing surfaces of the thrust plate 16 and the thrust pressing plate 25. When the hub 21 rotates, the lubricant 24 is pressured up by a pumping action caused in the thrust hydrodynamic pressure generating grooves 17, and a hydrodynamic pressure is generated; the hub 21 is shaft-supported in a thrust direction by the hydrodynamic pressure generated by the lubricant 24.

The thrust pressing plate 25 is joined to the hub 21 after each hydrodynamic bearing section is assembled. The only joint to face the lubricant 24 is one made with the thrust pressing plate 25, and other sections to face the lubricant 24 are formed integrally, maintaining the sealability. The joint between the thrust pressing plate 25 and the hub 21 is completely sealed by an adhesive before injecting the lubricant 24, thus maintaining excellent sealability against the lubricant 24. The adhesive applied to the joint is filled in annular guiding grooves (not illustrated) formed on the joint, and is filled over the entire periphery of the joint without interruption by the capillary force of the adhesive filled thereat, and thereby the sealing structure is made compete.

To the thrust pressing plate 25 is provided a thin stopper plate 27 from the outer side (the top in the figure) via an absorber cloth 26; the lubricant 24 is surely prevented from dispersing externally by the absorber cloth 26 and the stopper plate 27.

The above mentioned two radial hydrodynamic bearing sections 22a and 22b, and two thrust hydrodynamic bearing sections 16a and 16b are formed so as to together create a continuous space along the shaft. At both axial ends of the bearing clearance including the four hydrodynamic bearing sections 16a, 16b, 22a, and 22b, two capillary sections, a capillary sealing section 31a made by tapering the space between the journal 12 and the thrust pressing plate 25 (a rotary member) and a capillary sealing section 31b made by tapering the space between the journal 12 and the radial hydrodynamic bearing section 22b (a rotary member), are-formed such that they sandwich the four hydrodynamic bearing sections 16a, 16b, 22a, 22b from the axial ends.

Figure 3:
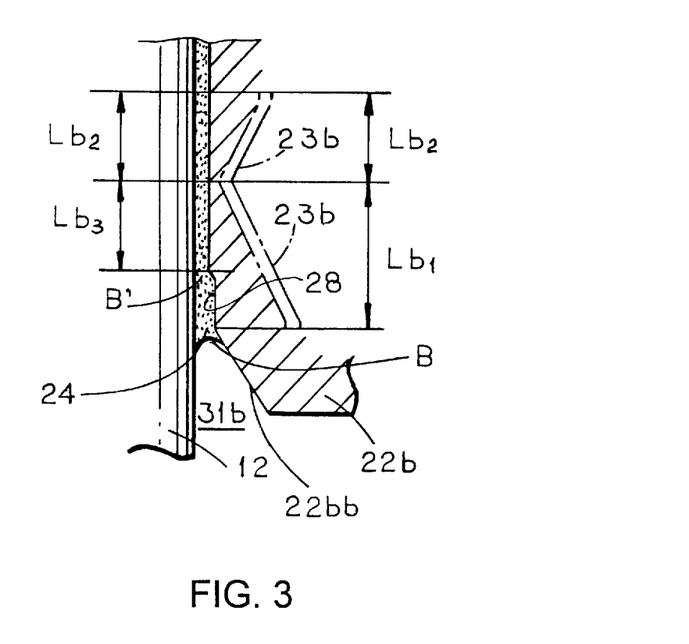
FIG. 3 is a partially magnified cross-section showing a structure of a lower capillary sealing section in the embodiment of FIG. 1.

Of the capillary sealing sections 31a and 31b, the capillary section 31b at the bottom is provided below the radial hydrodynamic bearing section 22b arranged at the lower side in the figure. Specifically, as shown in FIG. 3, the space between the inner circle wall 22bb at the axial outer end (the bottom end in the figure) of the radial hydrodynamic bearing section 22b and the outer circle surface of the journal 12 is tapered; the inner circle wall 22bb of the radial hydrodynamic bearing section 22b is formed with a slant surface such that the dimension of the space created with the outer circle surface of the journal 12 is continuously widened outwardly (toward the bottom in FIG. 1), and the interface of the lubricant 24 is positioned at the inclined surface. Therefore, the tapered space constituting the capillary sealing section 31b at the bottom in the figure directly communicates with the space constituting the bearing section of the radial hydrodynamic bearing section 22a at the bottom in the figure, and a concave section for oil reservoir is not provided at the communicating section between the capillary sealing section 31b and the radial hydrodynamic bearing section 22b.

Figure 5:
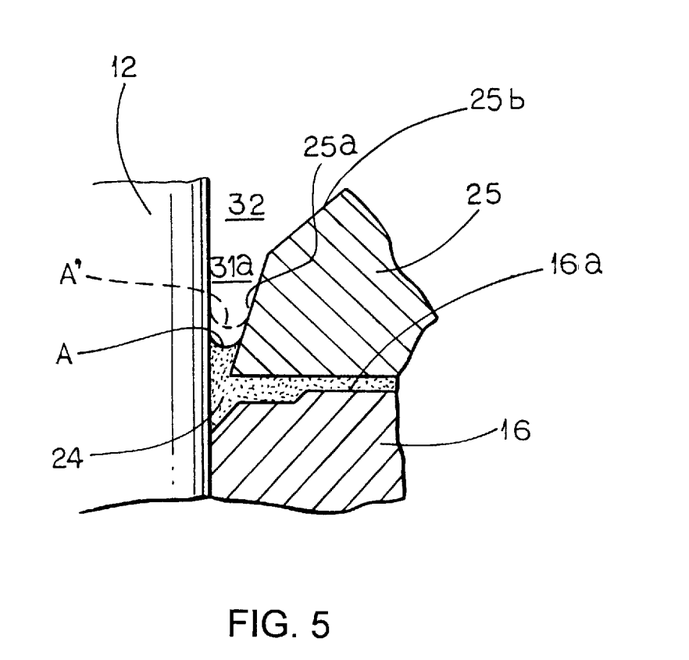
FIG. 5 is a partially magnified cross-section showing a structure of an upper capillary sealing section in the embodiment of FIG. 1.

The capillary sealing section 31 a at the upper side in the figure, as shown in FIG. 5, is formed by tapering the space between the inner circle wall 25a of the thrust pressing plate 25 and the outer circle surface of the journal 12, and the inner circle wall 25a of the thrust pressing plate 25 is formed with an inclined surface such that the dimension of the space created with the outer circle surface of the journal 12 is continuously widened outwardly (upwardly in FIG. 5), and the interface of the lubricant 24 is positioned at the inclined section.

Therefore, the capillary sealing sections 31a and 31b are provided along the shaft so that the tapered space constituting the capillary sealing sections 31a and 31b open outwardly (top and bottom in the figures); to create the tapered space for the capillary sealing sections 31a and 31b, the inner circle wall 25a of the thrust pressing plate 25 and the inner circle wall 22bb of the bottom radial hydrodynamic bearing section 22b, respectively facing the journal 12, are formed with inclined walls so as to enlarge the dimension of the space axially outwardly; the tapered sections having 20 μm to 300 μm of dimension are made to be the capillary sealing sections 31a and 31b. Also, at the outer sides of the capillary sealing sections 31a and 31b, an oil repellent section is provided which is coated with an oil repelling agent which strictly prevents the lubricant 24 from leaking outside.

The lubricant 24 is filled without interruption in the space between the two capillary sealing sections 31a and 31b including the four hydrodynamic bearing sections 16a, 16b, 22a, and 22b; the interfaces of the lubricant 24 at the top and bottom ends are, as shown by solid lines A and B respectively in FIGS. 3 and 5, are set to be placed at predetermined positions in the capillary sealing sections 31a and 31b when the motor is stopped. While the motor rotates, the interface of the lubricant 24 positioned at the interface B in the lower capillary sealing section 31b comes up to the position (shown by dashed lines B') which is led in the radial hydrodynamic bearing section 22b, and the interface of the lubricant 24 in the upper capillary sealing section 31a comes up to the position (shown by dashed lines A' in FIG. 5) from the interface A due to the movement of the lubricant 24.

The movement of the lubricant 24 is next described. The herringbone-configured hydrodynamic pressure generating grooves 23a and 23b formed on the radial hydrodynamic bearing sections 22a and 22b are configured, as shown in FIG. 2, by annularly arranging a pair of diagonal grooves in parallel which extend axially from both ends and meet each other at the center of the radial hydrodynamic bearing sections 22a and 22b. Each of the diagonal grooves constituting each of the hydrodynamic pressure generating grooves 23a and 23b are formed with a groove depth of several μm, and pressurizes the lubricant 24 axially from both ends toward the center.

At the upper radial hydrodynamic bearing section 22a, the pair of hydrodynamic pressure generating grooves 23a and 23a are formed such that their coaxial lengths La are the same; therefore, the downward pressure generated in the upper hydrodynamic pressure generating grooves 23a becomes equal to the upward pressure generated in the lower hydrodynamic pressure generating groove 23a, balancing the pressures axially from both ends toward the center.

At the lower radial hydrodynamic bearing section 22b at the axially outermost end, the axial length Lb1 of the diagonal groove on the axially outer side (the bottom side in the figure) of the pair of hydrodynamic pressure generating grooves 23b and 23b is set longer than the axial length Lb2 of the diagonal groove on the axially inner side (the top side in the figure), i.e., (Lb1>Lb2). By making different lengths to configure the grooves asymmetrical, the upward pressure generated by the bottom diagonal groove surpasses the downward pressure generated by the top diagonal groove, causing a predetermined differential pressure axially in one direction (upward in the figure) in the lubricant 24.

In such a way, the differential pressure generated in the lubricant 24 by the radial hydrodynamic bearing section 22b moves the lubricant 24 upwardly in the figure. However, the capillary sealing section 31a downstream (the top in the figure) in the moving direction of the lubricant 24, as illustrated in FIG. 5, is set to have a space capacity for allowing the increase (displaced amount), increased by the movement of the lubricant 24 during rotation of the motor and to retain the increased liquid in the sealing section 31a; therefore, the interface of the lubricant 24 is kept inside the capillary sealing section 31a as shown by dashed lines A' in FIG. 5 even during rotation of the motor. To achieve this, it is preferable to set the space capacity or the axial length of the capillary sealing section 31a downstream (the top in the figure) in the moving direction of the lubricant 24 three times or more larger or longer than the space capacity or the axial length of the capillary sealing section 31b on the side (the bottom side in the figure) which the lubricant 24 decreases due to its movement. It is also preferable that the capillary sealing section 31a, which tolerates the increase of the lubricant 24 due to its movement, is set larger than the actual space dimension of the capillary sealing section 31b where the lubricant 24 decreases, that is, the space dimension including the hydrodynamic pressure generating grooves 23b in the radial hydrodynamic bearing section 22b. With this configuration, an allowance can be provided for the variation in injection amount of the lubricant 24, and consequently, an extra amount can be provided for the decrease of the lubricant 24 due to its movement and evaporation. Specifically, the axial length of the capillary sealing section 31a is set to be 0.5 mm or more.

Since the capillary sealing section 31b upstream (the bottom side in the figure) in the moving direction of the lubricant 24 is provided at the axially outer end of the radial hydrodynamic bearing section 22b, when the lubricant 24 is moved upwardly by the above mentioned differential pressure, the lubricant 24 in the capillary sealing section 31b moves upwardly to disappear from the inside of the sealing section 31b, and the lubricant 24 also disappears from a part of the bottom in the radial hydrodynamic bearing section 22b. Specifically, the lubricant 24 runs dry, for example, over approximately ¼ of the entire axial length Lb1 of the lower hydrodynamic pressure generating grooves 23b; the interface of the lubricant 24 comes up to the position where the axial length Lb3 of the lubricant 24 left in the lower hydrodynamic pressure generating grooves 23b approximately equals to the axial length Lb2 of the upper hydrodynamic pressure generating grooves 23b. The hydrodynamic pressure generated in the lower hydrodynamic pressure generating grooves 23b is decreased by the amount the lubricant ran dry, and the lubricant 24 stops moving when the differential pressure is canceled.

Note that at the bearing surface area where the lubricant 24 of the radial hydrodynamic bearing 22b arranged axially outermost end runs dry and disappears, a hollow section 28 (a larger diameter section) constituted by making the space created with the journal 12 wider than the space between the normal bearing surfaces, and thereby, the inner circle surface of the radial hydrodynamic bearing section 22b does not contact the outer circle surface of the journal 12 even when a sudden force such as an impact is added when the lubricant 24 is running dry and disappearing. The hollow section 28 may be made such that the space dimension is approximately 2 μm longer than a normal bearing clearance by creating a step shown in FIG. 3, or the outermost space dimension of the hollow section 28 is about 0.5 μm to 3 μm longer than a normal bearing clearance by making it in a tapered shape.

Referring again to FIG. 1, a lubricant inlet 32 is provided at the axially outer side (the top side in the figure) of the capillary sealing section 31a such that it is continuous to the capillary sealing section 31a. The lubricant inlet 32, as shown in FIG. 5, is constituted of a widened space which is continuous to a tapered space which constitutes the capillary sealing section 31a, and is formed by inclining the inner circle wall 25b of the thrust pressing plate 25 facing the journal 12 by a larger opening angle than the inclined wall 25a constituting the capillary sealing section 31a.

The inclined wall 25b constituting the lubricant inlet 32 is formed with an opening angle of 70° or less with respect to the axis of the journal 12 so that the lubricant 24 axially flows well, and the space dimension of the lubricant inlet 32 at the axially outermost end created with the journal 12 is set to be 400 μm or more. If the space capacity of the lubricant inlet 32 is set larger than the capacity of the bearing clearance connecting the two capillary sealing sections 31a and 31b, the entire amount of the lubricant 24 can be temporarily injected into the lubricant inlet 32; after that, the lubricant 24 is guided to the internal bearing side (the bottom side in the figure) by capillary force, and refills the entire length of the bearing clearance on release of the air.

Between the radial hydrodynamic bearing sections 22a and 22b, a lubricant reservoir 33, an enlarged space created with the journal 12 by hollowing the inner circle surface of the cylindrical member, is provided. The space dimension of the lubricant reservoir 33 in this embodiment is set to be at least 40 μm or at least three times longer than the dimension of the bearing clearance in the radial hydrodynamic bearing sections 22a and 22b. This is for maintaining at least a predetermined amount of the lubricant 24 in the lubricant reservoir 33 to keep an extra amount of the lubricant 24 for the radial hydrodynamic bearing sections 22a and 22b, thus prolonging usable life.

According to the above mentioned embodiment, the interfaces of the lubricant 24 exist in the capillary sealing sections 31a and 31b composed of the tapered spaces between the journal 12 and the thrust pressing member or the radial hydrodynamic bearing section 22b (a rotary member), the capillary sealing force is always ready to work even when the apparatus is stopped as well as during rotation; therefore, with a pull-back force of the capillary sealing force, the lubricant 24 can be maintained at an internally predetermined position. When a large inertial force is added, the hydrodynamic pressure due to fluid viscous drag of the lubricant 24 is generated in the capillary sealing sections 31a and 31b made of tapered spaces; this acts as a retaining force to prevent the lubricant 24 from dispersing outside the apparatus. During the rotation of the motor, a differential pressure is intentionally generated in the lubricant 24 at the radial hydrodynamic bearing section 22b, and the lubricant 24 moves to cancel differential pressure and to be in equilibrium. By forming the bearing section in advance so as to generate a differential pressure and specifying the direction the differential pressure is given, dispersion to the outside of the lubricant by its movement due to unexpected differential pressure can be prevented.

Since the capillary sealing section 31a downstream in the moving direction of the lubricant 24 is set to have a space capacity for allowing the deviation (the increase) of the lubricant caused by the movement, it can sufficiently tolerate the moving of the lubricant 24 caused by the differential pressure generated at the radial hydrodynamic bearing section 22b, thus preventing the lubricant 24 from leaking due to its movement.

The capillary sealing sections 31a and 31b simply constituted with inclined surfaces simplify manufacture and improve productivity.

Figure 6:
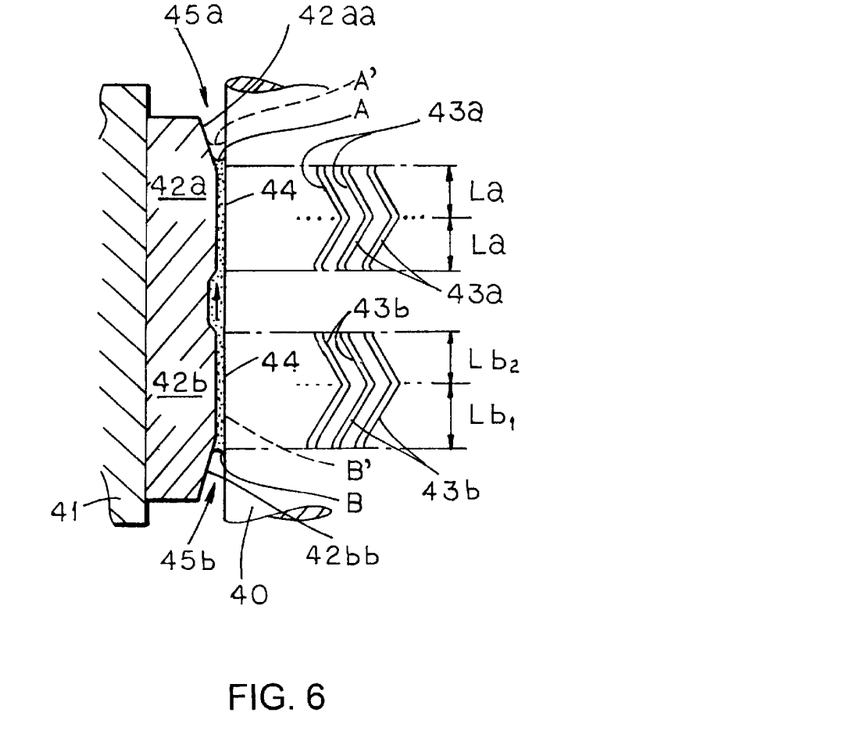
FIG. 6 is a half cross section showing an embodiment in which this invention is applied to a bearing apparatus having two radial hydrodynamic bearing sections.

In an embodiment shown in FIG. 6, this invention is applied to a hydrodynamic bearing apparatus in which two radial hydrodynamic bearings 42a and 42b are axially arranged in series; a shaft member 40 and a cylindrical member 41 are relatively rotatably supported via the two radial bearing sections 42a and 42b. In this embodiment, any member of the shaft member 40 and cylindrical member 41 may rotate.

The two radial bearing sections 42a and 42b are fixed to the cylindrical member 41. On at least one of the facing surfaces of radial hydrodynamic bearing sections 42a and 42b and the shaft member 40, herringbone-configured radial hydrodynamic pressure generating grooves 43a and 43b, for example, as shown in a development elevation in the figure are grooved, and a lubricant 44 made of an oil, a magnetic fluid, and the like is interposed between both facing surfaces.

The two radial hydrodynamic bearing sections 42a and 42b are arranged so that they together constitute a continuous bearing clearance along the shaft; axially at both ends of the bearing clearance including the two radial hydrodynamic bearing sections 42a and 42b, two capillary sealing sections 45a and 45b constituted of spaces between the radial hydrodynamic bearing sections 42a and 42b and the shaft member 40 are provided such that they sandwich the two radial hydrodynamic bearing sections 42a and 42b axially from both ends.

The capillary sealing sections 45a and 45b are provided respectively at the outside of the radial hydrodynamic bearing sections 42a and 42b respectively arranged at the top and bottom. The tapered spaces constituting the capillary sealing sections 45a and 45b directly communicate with the spaces which constitute the bearing sections of the radial hydrodynamic bearing sections 42a and 42b. The capillary sealing sections 45a and 45b are provided along the shaft such that the tapered space constituting the sealing sections 45a and 45b open outwardly at the top and bottom. The inner circle walls 42aa and 42bb of the radial hydrodynamic bearing sections 42a and 42b respectively facing the shaft member 40 are formed as inclined walls which continuously widen the space dimension axially outwardly so that they constitute tapered spaces for the capillary sealing sections 42a and 45b.

As described, the lubricant 44 is filled without interruption in the space between the two capillary sealing sections 45a and 45b including the two radial hydrodynamic bearing sections 42a and 42b; the interfaces of the lubricant 44 at the top and bottom ends are set to be at predetermined positions in the capillary sealing sections 45a and 45b, shown by solid lines A and B respectively, when the apparatus is stopped. During rotation, the interface in the bottom capillary sealing section 45b moves up from the position shown by solid line B to the position, shown by dashed line B', which is led in the radial hydrodynamic bearing section 42b. At that time, the interface of the lubricant 44 in the upper capillary sealing section 45a moves up from the position in the capillary sealing section 45a, shown by solid line A, to the position shown by dashed lines A'. Such movement of the lubricant 44 is caused because the herringbone shape of the lower radial hydrodynamic pressure generating grooves 43b is axially asymmetrical, thereby generating a differential pressure in the lubricant, in the same manner as in the previously described embodiment. In other words, the pair of hydrodynamic pressure generating grooves 43a and 43b are set to have the same axial length La in the upper radial hydrodynamic bearing section 42a; however, the pair of hydrodynamic pressure generating grooves 43b and 43b in the lower radial hydrodynamic bearing section 42b are set such that the axial length Lb1 of the diagonal groove axially at the outer side (the lower side in the figure) is longer than the axial length Lb2 of the diagonal groove axially at the inner side (the upper side in the figure) i.e., (Lb1>Lb2).

In this manner, with the differential pressure generated in the lubricant at the radial hydrodynamic pressure section 42b, the lubricant 44 moves upwardly in the figure; the interface of the lubricant 44 in the capillary sealing section 45a during rotation is positioned in the capillary sealing section 45a as shown by dashed lines A' in FIG. 6; the lubricant 44 in the capillary sealing section 45b moves upwardly and disappears from the capillary sealing section 45b to the position, as shown by dashed lines B' in FIG. 6, and a part of the lubricant 44 in the radial hydrodynamic bearing section 42b disappears, thus decreasing the hydrodynamic pressure generated in the lower hydrodynamic pressure generating grooves 43b to cancel the differential pressure.

Figure 7:
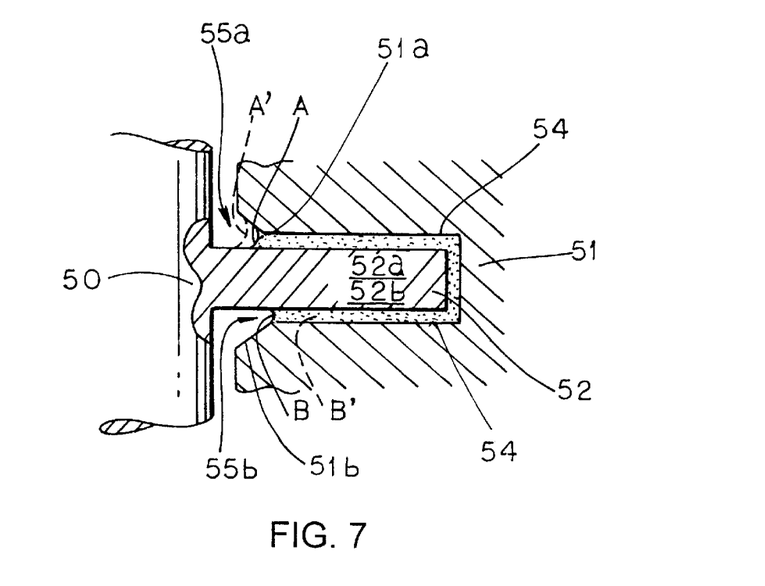
FIG. 7 is a half cross section showing an embodiment in which this invention is applied to a bearing apparatus having two thrust hydrodynamic bearing sections.

In an embodiment shown in FIG. 7, this invention is applied to a hydrodynamic bearing apparatus having two thrust hydrodynamic bearing sections 52a and 52b which are axially arranged horizontally in series; a shaft member 50 and a cylindrical member 51 are relatively rotatably supported via the two thrust bearing sections 52a and 52b.

Figure 8:
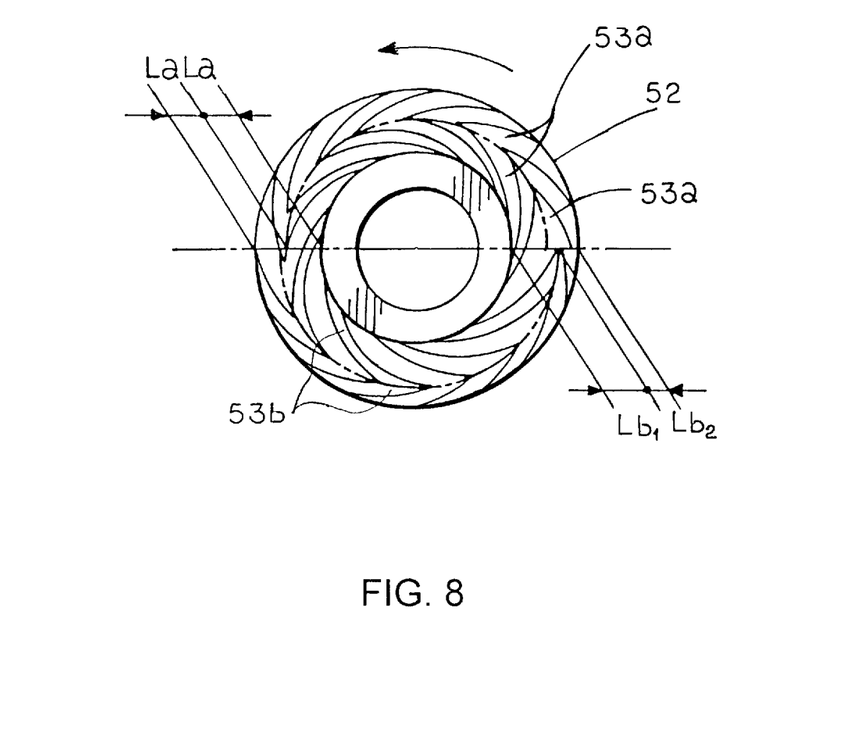
FIG. 8 is plan view showing one example of a shape of hydrodynamic pressure grooves formed on the thrust hydrodynamic bearing section in FIG. 7.

A thrust plate 52 constituting the two thrust bearing sections 52a and 52b is integrally fixed to the shaft member 50. On at least one of the facing surfaces of the thrust hydrodynamic bearing sections 52a and 52b and the cylindrical member 51, herringbone-configured thrust hydrodynamic pressure generating grooves 53a, for example, shown in FIG. 8, are grooved such that they are annularly arranged in parallel; a lubricant 54 made of an oil, magnetic fluid, and the like is interposed between the facing surfaces.

In other words, the two thrust hydrodynamic bearing sections 52a and 52b are axially provided by a predetermined interval, and arranged horizontally in series so that they constitute a continuous bearing clearance in a horizontally recessed shape in cross section. At both ends of the bearing clearance including the thrust hydrodynamic bearing sections 52a and 52b two capillary sealing sections 55a and 55b are provided, which are made by tapering the spaces between the cylindrical member 51 and the thrust plate 52.

The capillary sealing sections 55a and 55b are provided at the innermost periphery of the thrust hydrodynamic bearing sections 52a and 52b, and made by tapering the axial space between the inner circle of the thrust plate 52 and the inner circle of the cylindrical member 51. Therefore, the tapered spaces constituting the capillary sealing sections 55a and 55b are directly communicated with the spaces which constitute the bearing sections of the thrust hydrodynamic bearing sections 52a and 52b. Besides, a concave section used for enlarging the space (capacity) is not provided at the communicating section between the capillary sealing section 55b and the thrust hydrodynamic bearing section 52b.

The capillary sealing sections 55a and 55b at both sides are provided such that the tapered spaces constituting the sealing sections 55a and 55b open toward the inner circle side. The inner circle wall of the cylindrical member 51 opposite the thrust plate 52 is formed with inclined walls 51a and 51b with which the space dimension is widened toward the inner circle side so that the tapered spaces for the capillary sealing section 55a and 55b are constituted.

As described before, the lubricant 54 is filled without interruption in the space between the two capillary sealing sections 55a and 55b including the two thrust hydrodynamic bearing sections 52a and 52b. The interfaces of the lubricant 54 at the top and bottom sides are set to be at predetermined positions in the capillary sealing sections 55a and 55b, as shown by solid lines A and B respectively in the figure, when the apparatus is stopped; during rotation, the interface of the lubricant 54 in the lower capillary sealing section 55b moves from the position shown by solid line B into the internal position, shown by dashed line B', in the thrust hydrodynamic bearing section 52b; at that time, the interface of the lubricant 54 in the upper capillary sealing section 55a moves from the position shown by solid line A to the position shown by dashed lines A'. Such a movement of the lubricant 54 is caused, in the same manner as the previously described embodiments, because the herringbone shape of the lower thrust hydrodynamic pressure generating grooves 53b is axially asymmetrical, thereby generating a differential pressure in the lubricant.

In other words, as shown in the upper half of FIG. 8, a pair of hydrodynamic pressure generating grooves 53a and 53a are set to have the length La for giving a hydrodynamic pressure in the same radius direction in the upper thrust hydrodynamic bearing section 52a. That is, although the length of the groove on the inner side is slightly longer than that on the outer side in relation to peripheral velocity and area, the grooves on both sides are actually formed in the same length so that the pressure from the grooves on both sides toward the center is balanced. On the other hand, as shown in the bottom half in FIG. 8, a pair of hydrodynamic pressure generating grooves 53b and 53b in the lower thrust hydrodynamic bearing section 52b are set such that the radius length Lb1 of the diagonal groove at the radiusly inner side is longer than the radius length Lb2 of the diagonal groove at the radiusly outer side, i.e., (Lb1>Lb2). As described, making the grooves asymmetrical of different radius lengths, the pressure generated by the diagonal grooves on the radiusly inner side surpasses that radially directed on the outer side, providing a structure for generating a differential pressure in the lubricant 54 applied from the capillary sealing section 55b toward the capillary sealing section 55a.

In this manner, with a differential pressure generated in the lubricant at the thrust hydrodynamic pressure section 52b, the lubricant 54 moves from the capillary sealing section 55b toward the capillary sealing section 55a. Since the capillary sealing section 55a downstream (the upper side in the figure) in the moving direction of the lubricant 54 is set to have a space capacity for allowing the increase of the liquid due to the movement of the lubricant 54 during the rotation of the motor, as shown in FIG. 7, the interface of the lubricant 54 even during rotation is positioned at the inclined wall 51a in the capillary sealing section 55a as shown by dashed lines A' in FIG. 7. On the other hand, since the capillary sealing section 55b upstream (the bottom side in the figure) in the moving direction is provided on the inner circle side of the thrust hydrodynamic bearing section 52b, when the lubricant 54 deviates moving upwardly in the figure by the above mentioned differential pressure, the entire lubricant 54 in the lower capillary sealing section 55b moves radially outwardly and disappears from the capillary sealing section 55b to the position, as shown by dashed lines B' in FIG. 7, and a part of the lubricant 54 in the thrust hydrodynamic bearing section 52b disappears, thus decreasing the hydrodynamic pressure generated at the hydrodynamic pressure generating grooves 43b as much as the lubricant disappears, to cancel the differential pressure.

Figures 9A, 9B:
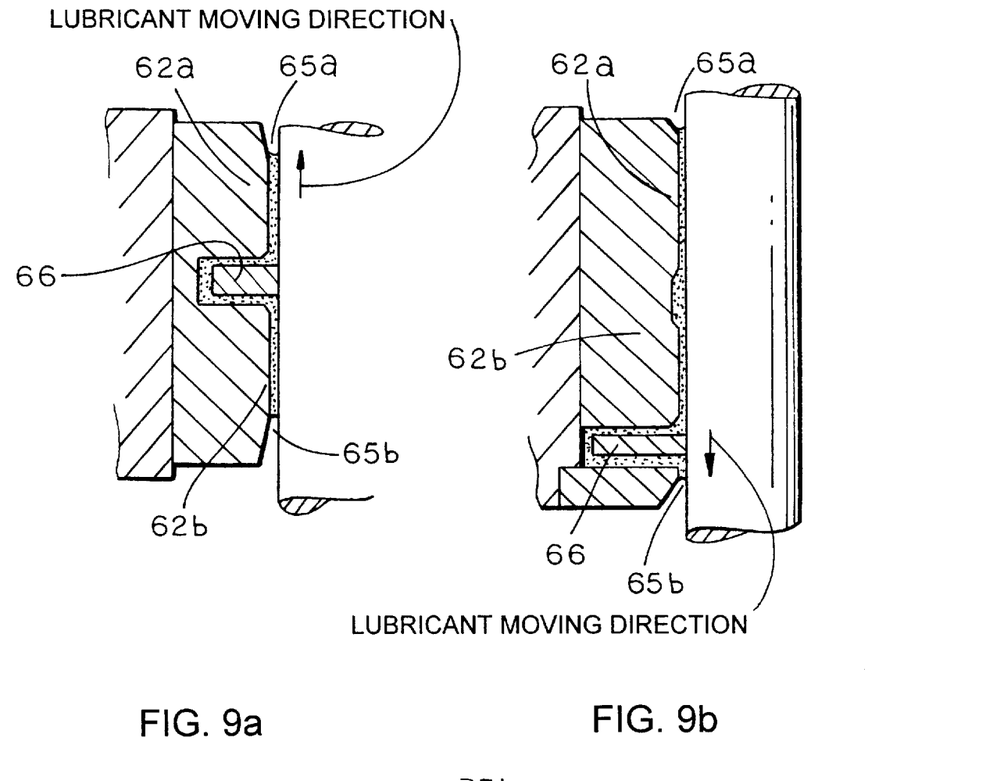
FIGS. 9(a) and 9(b) illustrate a half cross-section indicating schematically an example of modifying the positional relationship of the hydrodynamic bearing sections in the embodiment of FIG. 1.

FIGS. 9(a) and 9(b) show another embodiment of this invention. It is possible to arrange a thrust plate 66 which constitutes a thrust hydrodynamic bearing section between two radial hydrodynamic bearing sections 62a and 62b as shown in FIG. 9(a), or to arrange the thrust plate 66 adjacent to the lower radial hydrodynamic bearing section 62b as shown in FIG. 9(b).

Figure 10:
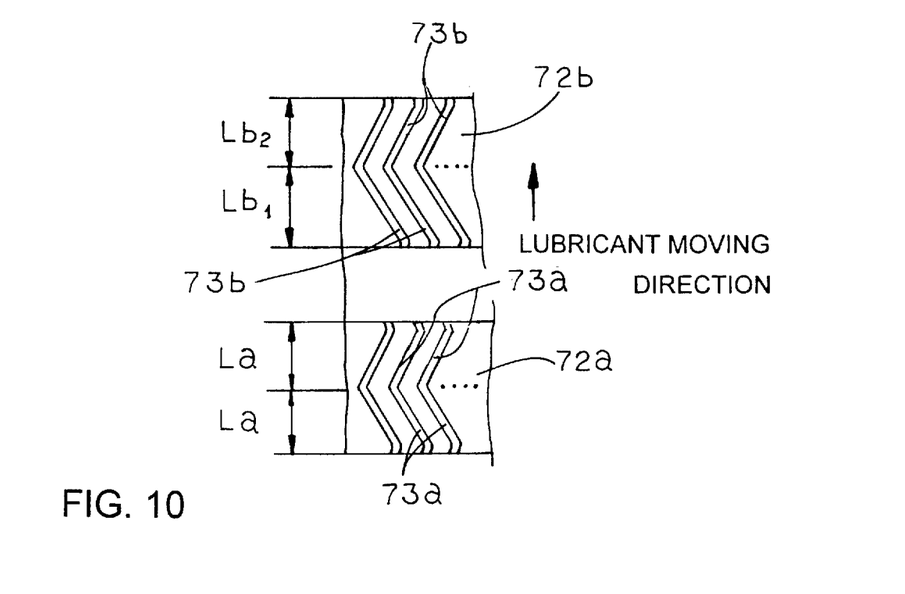
FIG. 10 is a half cross section showing schematically an example of modifying the positional relationship of the hydrodynamic bearing sections in the embodiment of FIG. 1.

As shown in FIG. 10, it is possible that hydrodynamic pressure generating grooves 73b for generating a differential pressure are provided at the top and hydrodynamic pressure generating grooves 73a for generating a 20 balanced hydrodynamic pressure are provided at the bottom in the figure. In this embodiment, the hydrodynamic pressure generating grooves 73a and 73a at the bottom in the figure are configured such that both grooves have approximately the same length La; the hydrodynamic pressure generating grooves 73b and 73b are configured such that the groove length Lb1 on the axially inner side (at the bottom side in the figure) is longer than the groove length Lb2 on the axially outer side (at the top side in the figure). By forming the grooves axially asymmetrical as described, a differential pressure can be generated in the lubricant to be applied axially in one direction (to the upper side in the figure).

As shown in FIG. 4, sometimes there is a chance that one the inner side or the outer side of a pair diagonal grooves 17 of the upper thrust hydrodynamic bearing becomes longer than the other due to errors and the like during the grooving process when creating the shape, resulting in pressurizing the lubricant 24 when the hydrodynamic pressure generating grooves 17 at the thrust hydrodynamic bearing section 16 are made in a shape with which the pressure toward the center balances. When the diagonal grooves 17 are shaped by the process error such that the lubricant 24 is pressurized toward the inner circle (when the groove 17a on the outer side of the pair of diagonal grooves 17a and 17a becomes longer than the other), a negative pressure may be generated, during rotation, in the lubricant reservoirs 33, X1, and X2 as shown in FIG. 1. If a negative pressure is generated in the lubricant reservoirs 33, X1, and C2, air contained in the lubricant is separated and gasified, causing lubricant leakage; therefore, it is preferable to configure the grooves to prevent it. An embodiment for it is described.

Figure 11:
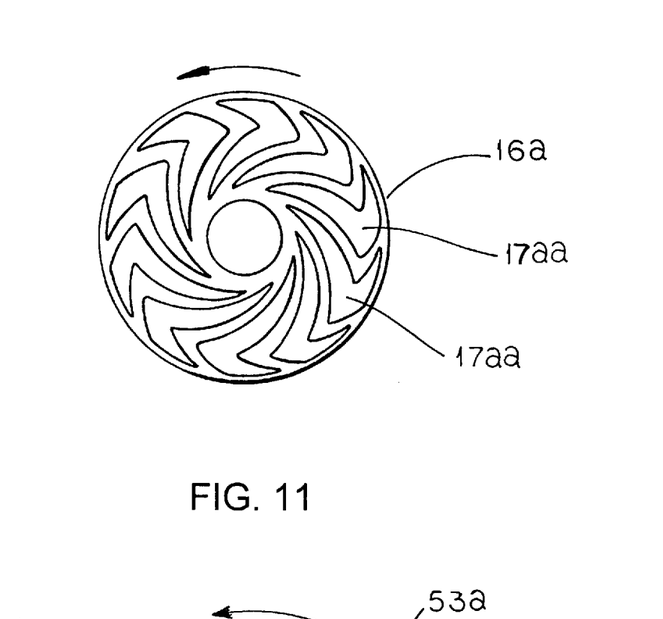
FIG. 11 is a plan view showing an example modifying the upper thrust hydrodynamic pressure generating grooves in the embodiment of FIG. 1.

FIG. 11 shows an embodiment in which the shape of the herringbone-configured thrust hydrodynamic pressure generating grooves 17aa formed on the axially upper end surface of the thrust plate 16, which constitutes the thrust hydrodynamic bearing 16a positioned in the downstream in the moving direction of the lubricant. Note that the herringbone pattern constituting the thrust hydrodynamic bearing section 16b on the axially bottom surface of the thrust plate 16 is configured in the same shape as in FIG. 4.

Figure 12:
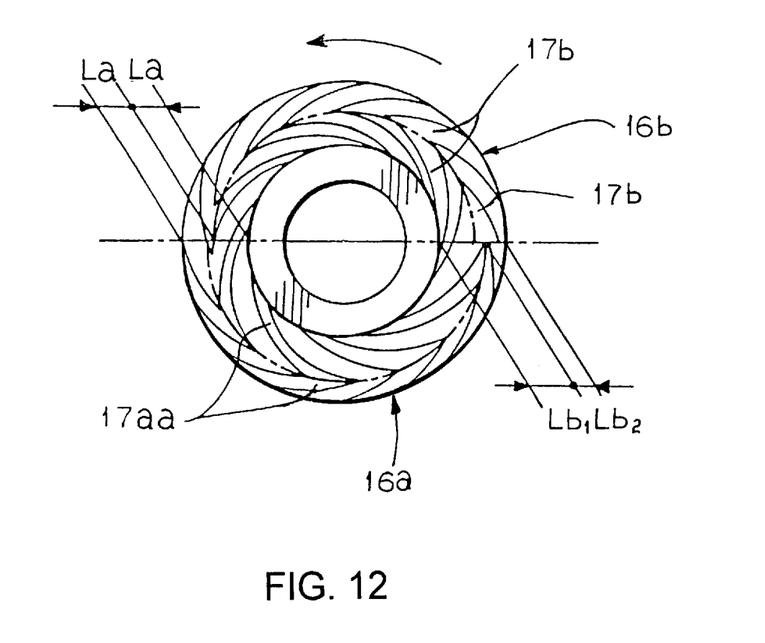
FIG. 12 is a descriptive plan view showing both a half top and a half bottom of a specific dimension and shape of the bottom and upper thrust hydrodynamic pressure generating grooves in the embodiment of FIG. 11.

In other words, the upper thrust hydrodynamic bearing 16a adjacent to the capillary sealing section 31a is configured, as shown in the bottom half in FIG. 12, such that, of the pair of hydrodynamic pressure generating grooves 17aa and 17aa, the radius length Lb1 of the diagonal groove on the radiusly inner side is longer than the radius length Lb2 of the diagonal groove on the radiusly outer side (Lb1>Lb2). By configuring the grooves substantially asymmetrical in a radius direction, the pressure generated by the diagonal groove on the radiusly inner side surpasses that on the radially directed outer side; then, a differential pressure P2 (see FIG. 13) to be applied radially outwardly is generated in the lubricant 24 before the capillary sealing section 31a. Configured in such a way, the lubricant 24 is pressurized by a pumping action in the thrust hydrodynamic pressure generating grooves 17aa and 17b during the rotation of the hub 21 to generate a hydrodynamic pressure, and thereby, the hub 21 is shaft-supported in a thrust direction. As described in the embodiment of FIG. 1, the differential pressure P1 generated in the radial hydrodynamic bearing section 22b and the differential pressure P2 generated in the thrust hydrodynamic bearing section 16a affect the lubricant 24 continuously filled in the bearing clearance. In this embodiment, however, the shape of the radial hydrodynamic pressure generating grooves 23b and the thrust hydrodynamic pressure generating grooves 17aa are determined such that the difference (P1−P2) between the differential pressures, P1 generated in the radial hydrodynamic bearing section 22b and P2 generated in the thrust hydrodynamic bearing section 16a, is (P1−P2)>0.

Figure 13:
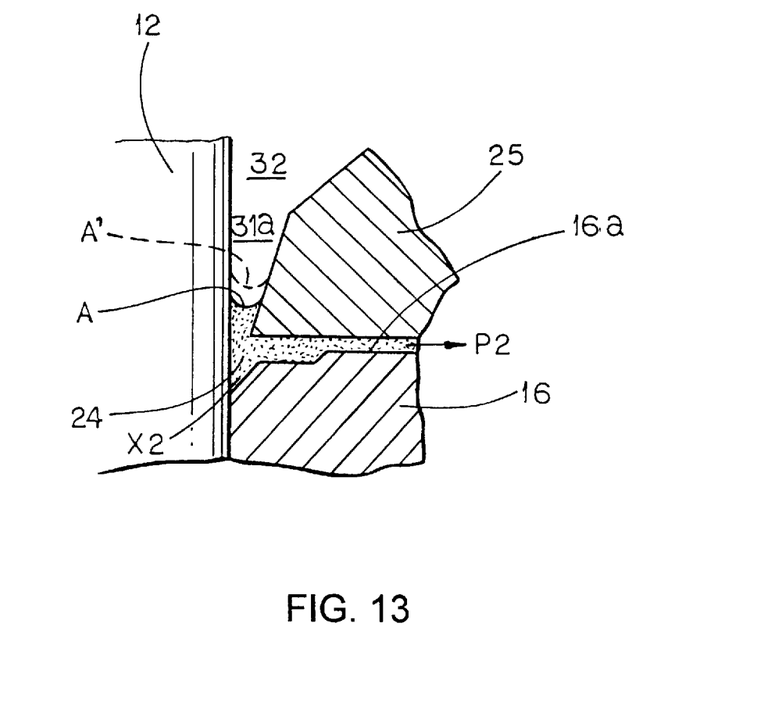
FIG. 13 is a partially magnified cross section showing a structure of the upper capillary sealing section in the embodiment of FIG. 11.

For this reason, the lubricant 24 moves upwardly in the figure by the relationship of P1>P2. The capillary sealing section 31a downstream (the top side in the figure) in the moving direction of the lubricant 24 is set to have a space capacity for allowing the variation of the lubricant due to its movement, as shown in FIG. 13. As described above, the interface of the lubricant 24 is maintained in the capillary sealing section 31a even during the rotation of the rotor (See the dashed lines A' in FIG. 13).

In the above mentioned embodiment, the differential pressure P1 is intentionally generated in the lubricant at the radial hydrodynamic bearing section 22b, the bearing section on the outermost end; the differential pressure P2, which is opposite the above mentioned differential pressure P2, is generated in the lubricant 24 at the thrust hydrodynamic bearing section 16a, the bearing section at the outermost end on the other side; the lubricant 24 is slightly shifted to cancel the difference between the differential pressures (P1−P2) in the lubricant 24, therefore, to be in equilibrium. In other words, the interface of the lubricant 24 moves from A to A' in the capillary sealing section 31 a; the interface of the lubricant 24 moves from B to B' in the capillary sealing section 31b. Balancing in such a way, the lubricant 24 is prevented from dispersing outside during rotation. This balance is obtained by the equilibrium between the two pressures generated in the lubricant 24, one generated by the thrust hydrodynamic pressure generating grooves 17aa at the thrust hydrodynamic bearing section 16a at the outermost end on one side, toward other bearing side (the lubricant reservoir 33 side) and one generated by the radial hydrodynamic pressure generating grooves 23b of the radial hydrodynamic bearing section 22b at the outermost end on the other side, toward the other bearing side (the lubricant reservoir 33 side). Therefore, the above mentioned three lubricant reservoirs 33, X1, and X2 are all pressured. For this reason, in these lubricant reservoirs 33, X1, and X2, air contained in the lubricant 24 is not separated and gasified, thus preventing its volume expansion.

Note that the embodiment described referring to FIG. 3 describes the example in which the radial hydrodynamic pressure generating grooves are formed on at least one of the facing surfaces of the journal 12 and the rotary member 22a and 22b; however, it is also preferable to provide the lower radial hydrodynamic pressure generating grooves 23b on the journal 12.

This is because, if the radial hydrodynamic pressure generating grooves 23b are provided on the rotary member 22b, when the lubricant 24 moves upwardly in the figure during rotation, as described above and a part of the bottom of the radial hydrodynamic pressure generating grooves 23b is exposed, air is sent in by the rotation of the exposed radial hydrodynamic pressure generating grooves 23b; by the sent air and the uneven surface of the exposed and rotating hydrodynamic pressure generating grooves 23b, the interface of the lubricant 24 gets disordered, making it easier to include air bubbles; if the air bubbles are accumulated in the lubricant reservoir 33, the volume of the reservoir 33 is expanded causing the possibility for the lubricant to disperse outside. However, when the radial hydrodynamic pressure generating grooves 23b are provided on the journal 12, if the lubricant 24 moves during rotation to expose a part of the radial hydrodynamic pressure generating grooves 23b, the interface of the lubricant 24 can be restricted from disordering compared to the case in which the radial hydrodynamic pressure generating grooves 23b are formed on the rotary member 22b. For this reason, air bubbles are prevented from being included, and the chances are eliminated that the lubricant 24 disperses outside during rotation. Note that when the radial hydrodynamic pressure generating grooves 23b, which are exposed when the lubricant 24 moves during rotation, are formed on the journal 12, other hydrodynamic pressure to generating grooves, i.e., the hydrodynamic pressure generating grooves 23a, 17a, 17b, which are not exposed out of the lubricant 24 during rotation, can be formed on whichever the fixed member or the rotary member.

Note that if the difference between the differential pressures is set, reversed from the above mentioned embodiment, to (P1–P2)<0, and the sealing section for tolerating the lubricant movement is set to the opposite side, the lubricant 24 moves downwardly to be in equilibrium; therefore, the lower radial hydrodynamic pressure generating grooves 23b are not exposed. In such case, even if the radial hydrodynamic pressure generating grooves 23b are formed on the rotation member 22a and 22b, the chance for generating air bubbles is reduced. The interface of the lubricant 24 is positioned at the upper thrust hydrodynamic bearing section 16a due to the movement of the lubricant 24, and the chance may occur for mixing air bubbles in the interface of the lubrication thereat due to the thrust hydrodynamic pressure generating grooves 17a; however, even if such air bubbles are generated to some extent, the air bubbles are released into air by a strong centripetal force (the force which the lubricant 24 given a centrifugal force pushes air bubbles having a light specific gravity inwardly) effect, preventing air bubbles from mixing. Note that there may be a chance that the hydrodynamic pressure generating grooves 17b of the thrust hydrodynamic bearing section 16b and the hydrodynamic pressure generating grooves 23a of the radial hydrodynamic bearing section 22a may also be shaped such that the lubricant 24 is pressurized in either direction due to process errors; however, since this pressure is not intentionally generated, this can be ignored because it is small compared to the above mentioned differential pressures P1 and P2 which are intentionally generated.

Figure 14:
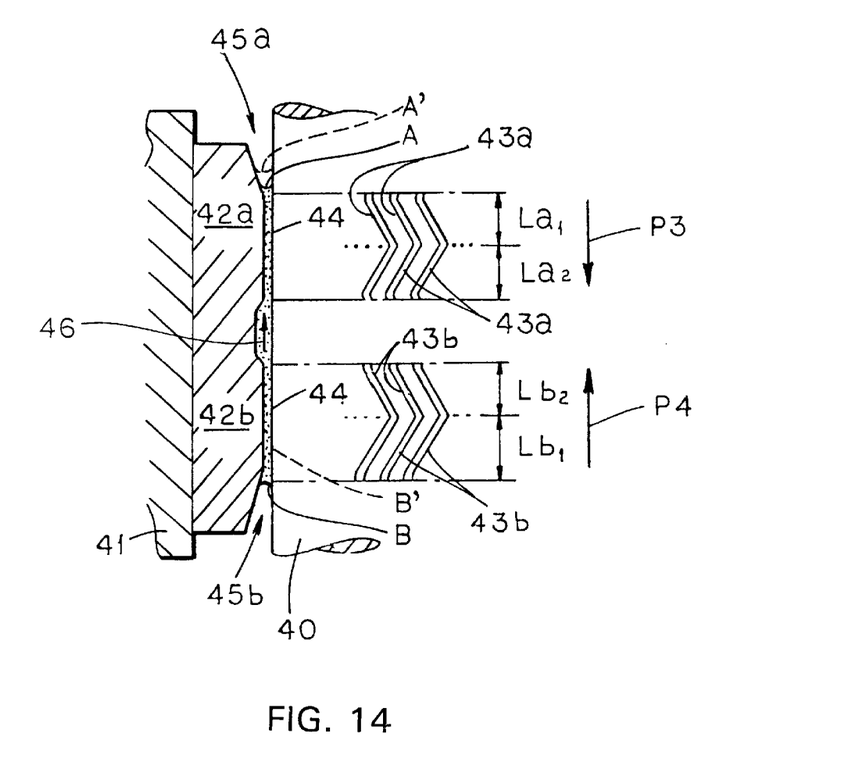
FIG. 14 is a half cross section showing another embodiment in which this invention is applied to a hydrodynamic bearing apparatus having two radial hydrodynamic bearing sections.

An embodiment shown in FIG. 14 is a modified embodiment of the one shown in FIG. 6. In this embodiment, two radial bearing sections 42a and 42b are fixed to the cylindrical member 41; on at least one (preferably on the fixed member side as mentioned) of the facing surfaces of the radial hydrodynamic bearing sections 42a and 42b and the shaft member 40, herringbone-configured (for example, as shown in a development elevation in the figure) radial hydrodynamic pressure generating grooves 43a and 43b are grooved, and the same capillary sealing sections 45a and 45b as in the previous embodiment are provided.

At the upper radial hydrodynamic bearing section 42a, a pair of hydrodynamic pressure generating grooves 43a and 43a are configured such that the axial length La1 of the diagonal groove axially on the outer side is longer than the axial length La2 of the diagonal groove axially on the inner side, i.e., (La1>La2); with such an axially asymmetrical groove shape, the downward pressure generated by the diagonal groove at the top in the figure surpasses the upward pressure generated by the diagonal groove at the bottom in the figure, thus generating a predetermined differential pressure P3 in the lubricant 44 to be applied axially in one direction (downward in the figure).

At the lower radial hydrodynamic bearing section 42b, on the other hand, a pair of hydrodynamic pressure generating grooves 43b and 43b are configured such that the axial length Lb1 of the diagonal groove axially on the outer side (the lower side in the figure) is longer than the axial length Lb2 of the diagonal groove axially on the inner side (the upper side in the figure), i.e., (Lb1>Lb2); therefore, the upward pressure by the bottom diagonal groove surpasses the downward pressure by the top diagonal groove, thus generating a predetermined differential pressure P4 in the lubricant 44 to move axially in one direction (the upper side in the figure).

Both the differential pressure P3 generated by the upper radial hydrodynamic bearing section 42a and the differential pressure P4 generated by the lower radial hydrodynamic bearing section 42b affect the lubricant 44 which is continuously filled in the bearing clearance. In this embodiment, the radial hydrodynamic pressure generating grooves 43b and 43a are shaped so that the difference (P4–P3) between the differential pressures, P4 generated at the radial hydrodynamic bearing section 42b and P3 generated at the radial hydrodynamic bearing section 42a, is in a relation, (P4>P3) >0. The lubricant reservoir 46 is axially provided at the area between the radial hydrodynamic bearing sections 42a and 42b.

For this reason, during rotation, the lubricant 44 moves slightly upwardly to cancel the difference between the differential pressures (P4–P3); the interface of the lubricant 44 on the upper side in the figure is maintained in the upper capillary sealing section 45a, shown by dashed lines A' in the figure, and the interface of the lubricant 44 on the lower side is in the internal position shown by dashed lines B' in the figure, in the radial hydrodynamic bearing section 42b positioned on the bottom side to balance.

This balance is obtained by the equilibrium between two pressures in the lubricant 44, one generated by the radial hydrodynamic pressure generating grooves 43a at the radial hydrodynamic bearing section 44a at the outermost end on one side, toward other radial hydrodynamic bearing 44a side (the lubricant reservoir 46 side) and one generated by the radial hydrodynamic pressure generating grooves 43b of the radial hydrodynamic bearing section 42b at the outermost end on the other side, toward the other hydrodynamic bearing 42a side (the lubricant reservoir 46 side), thus pressurizing the lubricant reservoir 46. For this reason, in the lubricant reservoir 44, air contained in the lubricant 44 is not separated and gasified.

Since the lubricant 44 moves upwardly in the figure by the difference in the differential pressure (P4–P3) and deviates, the capillary sealing section 45a downstream (the upper side in the figure) in the moving direction of the lubricant 44 is set to have a space capacity for tolerating the variation due to the movement of the lubricant 44; the capillary sealing section 45b upstream (the lower side in the figure) in the moving direction of the lubricant 44 moves to a position shown by dashed lines B' in FIG. 14. Note that if the radial hydrodynamic pressure generating grooves 43b which are exposed when the lubricant 44 moves during rotation are formed on the fixed member, as described, the intermixing of air bubbles can be prevented, and the lubricant 44 can be prevented from dispersing outside during rotation.

Figure 15:
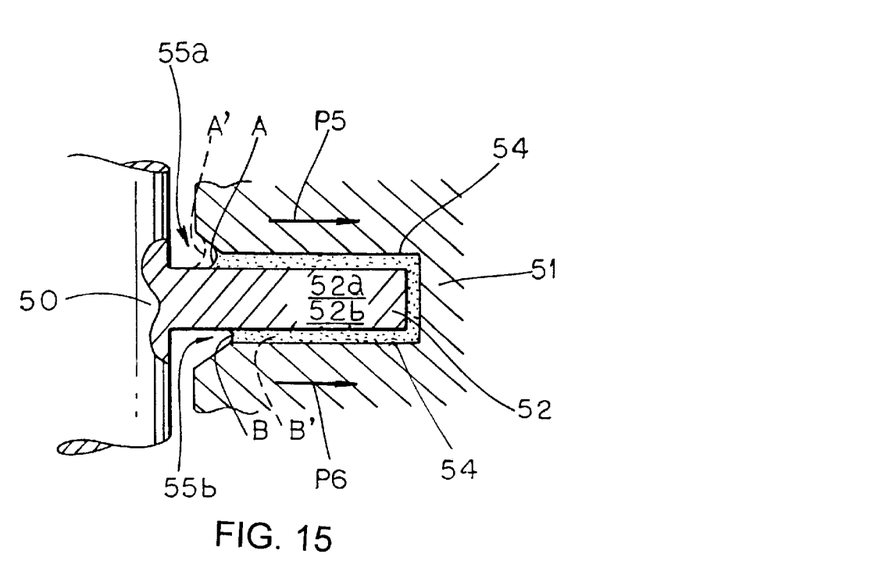
FIG. 15 is a half cross section showing another embodiment in which this invention is applied to a hydrodynamic bearing apparatus having two thrust hydrodynamic bearing sections.

As shown in an embodiment in FIG. 15, the thrust hydrodynamic pressure generating grooves may be shaped modifying the embodiment shown in FIG. 7 so that a differential pressure P5 to be applied radiusly outwardly is generated in the lubricant 24 at the upper thrust hydrodynamic bearing section 52a, a differential pressure P6 to be applied radiusly outwardly is generated in the lubricant 24 at the lower thrust hydrodynamic bearing section 52b, and the lubricant 54 continuously filled in the bearing clearance is affected by the differential pressure P5 generated at the upper thrust hydrodynamic bearing section 52a and the differential pressure P6 generated by the lower thrust hydrodynamic bearing section 52b, to make the difference (P6−P5) between the differential pressures P6 and P5 (P6−P5)>0.

The hydrodynamic pressure generating grooves to which this invention is applied are not limited to the herringbone shape as in the above embodiments, but this invention can be applied to hydrodynamic pressure generating grooves of any other shape. The above mentioned embodiments are ones in which this invention is applied to a journal type motor; however, the invention can be applied to a rotary shaft type motor in the same manner. This invention also can be applied to any hydrodynamic bearing apparatus other than an HDD motor as described above.

As described above, this invention can provide a hydrodynamic bearing apparatus of simple and inexpensive structure to surely prevent a lubricant from leaking, wherein capillary sealing sections are provided at both ends of the bearing clearance to prevent the lubricant from dispersing outside, and a differential pressure is intentionally generated in the lubricant at hydrodynamic bearing sections, for moving the lubricant to cancel the differential pressure in the lubricant; thereby, lubricant leakage is prevented which is normally caused by the unexpected movement of the lubricant during rotation; in addition, the space capacity of the capillary sealing section is set to a capacity for allowing the movement of the lubricant, and thereby, lubricant leakage is prevented.

Configuring the hydrodynamic pressure grooves at the hydrodynamic bearing section at the outermost end to press the bearing clearance (the lubricant reservoir) between both the hydrodynamic bearing sections with the lubricant, air contained in the lubricant in the bearing clearance is surely prevented from being separated and gasified, preventing the lubricant leakage more tightly.

While the foregoing description and drawings represent the preferred embodiments of the present invention, it will be obvious to those skilled in the art that various changes and modifications may be made therein without departing from the true spirit and scope of the present invention.

What is claimed is:

1. A hydrodynamic bearing apparatus comprising:
   at least two hydrodynamic bearing sections for relatively rotatably supporting a shaft member and a cylindrical member whose surface facing said shaft member is in a cylindrical shape, said bearing sections being formed so that they together constitute a continuous bearing clearance;
   a hydrodynamic pressure generating means for generating hydrodynamic pressure in a lubricant filled in said bearing clearance being formed on at least one of said shaft member and said cylindrical member at each of said hydrodynamic bearing sections;
   two capillary sealing sections made by tapering the space between said shaft member and said cylindrical member being provided at both ends of said bearing clearance including said two hydrodynamic bearing sections such that they sandwich said hydrodynamic bearing sections at both ends;
   said lubricant being filled without interruption in a bearing clearance between two capillary sealing sections including said hydrodynamic bearing sections;
   at least one of said hydrodynamic pressure generating means at said two hydrodynamic bearing sections being shaped asymmetrically so that a predetermined differential pressure moving in one direction in said bearing clearance is generated by the rotation to move said lubricant in one direction in said bearing clearance; and
   the capillary sealing section, of said two capillary sealing sections, downstream in the moving direction of said lubricant being set to have a space capacity for allowing the movement of the lubricant, and being configured so that said lubricant moves by a predetermined amount to cancel the differential pressure, which is generated at said hydrodynamic bearing sections when said shaft member and said cylindrical member relatively rotate, and so that the increase of the lubricant in said capillary sealing section downstream in the moving direction, resulting from the movement of said lubricant, is retained therein.

2. The hydrodynamic bearing apparatus as set forth in claim 1, wherein the spaces between said shaft member and said cylindrical member, which create said capillary sealing sections, continuously widen outwardly from the bearing side.

3. The hydrodynamic bearing apparatus as set forth in claim 1, wherein said capillary sealing sections are formed such that the space between said shaft member and said cylindrical member is set to be between 20 $\mu$m to 300 $\mu$m.

4. The hydrodynamic bearing apparatus as set forth in claim 1, wherein said shaft member and said cylindrical member are formed such that two radial hydrodynamic bearing sections and two thrust hydrodynamic bearing sections together constitute a continuous bearing clearance along the shaft; and said capillary sealing sections are provided axially at both ends of said bearing clearance including said four hydrodynamic bearing sections.

5. The hydrodynamic bearing apparatus as set forth in claim 1, wherein one of said hydrodynamic bearing sections is a radial bearing section, one of said capillary sealing sections is provided axially at the outer end of said radial hydrodynamic bearing section, and the space constituting a bearing section of said radial hydrodynamic bearing section and the space constituting said capillary sealing section communicate with each other.

6. The hydrodynamic bearing apparatus as set forth in claim 1, wherein one of said hydrodynamic bearing sections is a thrust bearing section, and one of said capillary sealing sections is formed by the space between said shaft member and a member constituting the thrust hydrodynamic bearing section.

7. The hydrodynamic bearing apparatus as set forth in claim 1, wherein of said two capillary sealing sections, the capillary sealing section on the side for allowing the varied amount of the lubricant due to the A movement of said lubricant has a space capacity or an axial length three or more times larger or longer than that of the capillary sealing section on the side where said lubricant decreases due to the movement.

8. The hydrodynamic bearing apparatus as set forth in claim 1, wherein of said two capillary sealing sections, the capillary sealing section on the side for allowing the deviation of said lubricant due to the movement of the lubricant has a larger space dimension than an actual bearing clearance dimension at said hydrodynamic bearing section on the side where said lubricant decreases due to its movement, which includes said hydrodynamic pressure generating means.

9. The hydrodynamic bearing apparatus as set forth in claim 1, wherein the axial length of the capillary sealing section on the side for allowing the variation of said lubricant due to the movement of said lubricant is set to be at least 0.5 mm.

10. The hydrodynamic bearing apparatus as set forth in claim 1, wherein a lubricant inlet having an inclined wall which constitutes a wide space is provided axially at the outer side of said capillary sealing section so that the space thereof is axially continuous to said capillary sealing sections; said inclined wall of said lubricant inlet being formed with an angle of at most 70° opening axially toward the outer side; and the space dimension axially at the outermost end of said lubricant inlet being set to be at least 400 $\mu$m.

11. The hydrodynamic bearing apparatus as set forth in claim 10, wherein the space capacity of said lubricant inlet is set larger than the capacity of the bearing clearance between two capillary sealing sections.

12. The hydrodynamic bearing apparatus as set forth in claim 1, wherein said hydrodynamic pressure generating means is formed in herringbone-pattern in which a pair of diagonal grooves extending axially from both ends meet at the center; and said pair of diagonal grooves are configured in that the length of the groove extending from one end is longer than that extending from the other end so that a differential pressure is generated.

13. The hydrodynamic bearing apparatus as set forth in claim 1, wherein said hydrodynamic pressure generating means is formed axially or radially asymmetrical so as to cancel a differential pressure generated due to a partial loss of said lubricant in the hydrodynamic bearing section provided axially at the outermost end.

14. The hydrodynamic bearing apparatus as set forth in claim 13, wherein said hydrodynamic bearing section provided axially at the outermost end is formed such that the space between said shaft member and a member which constitutes said bearing sections where said lubricant disappears is larger than the spaces at the other sections.

15. The hydrodynamic bearing apparatus as set forth in claim 1, wherein said lubricant is maintained such that the interfaces axially at both ends are at predetermined positions in said capillary sealing sections when the apparatus is stopped; when the apparatus rotates, the interface axially at one end is maintained within the capillary sealing section thereat, and the interface axially at the other end is set to an internal position in the hydrodynamic bearing section axially at the other end.

16. The hydrodynamic bearing apparatus as set forth in claim 1, wherein said lubricant is made of an oil having evaporation rate of $10^{-7}$ g/h • cm$^2$ or less (at 40°) and viscosity of 30 cP or less (at 40° C.).

17. The hydrodynamic bearing apparatus as set forth in claim 1, wherein said lubricant is of an oil composed by esterifying trimethylolporpane (TMP) or pentaerythritol (PE) and a linear or branched fatty acid having $C_{5-18}$.

18. The hydrodynamic bearing apparatus as set forth in claim 1, wherein a lubricant reservoir made by widening the space between said shaft member and said cylindrical member is provided between said hydrodynamic bearing sections; the space dimension thereof being set to be at least 40 $\mu$m or three or more times longer than the dimension of the bearing space at said hydrodynamic bearing section.

19. The hydrodynamic bearing apparatus as set forth in claim 1, wherein said cylindrical member has only one joint of its two components, in which said lubricant is filled without interruption; said joint being completely sealed by an adhesive before said lubricant is injected.

20. The hydrodynamic bearing apparatus as set forth in claim 19, wherein an annular guiding groove is provided at said joint so that said adhesive is continuously guided over the entire periphery of said joint.

21. A hydrodynamic bearing apparatus comprising:
at least two hydrodynamic bearing sections for rotatably supporting a rotary member with respect to a fixed member constituting a continuous bearing clearance;
hydrodynamic pressure generating grooves being provided on at least one of said fixed member and rotary member constituting said hydrodynamic bearing sections for generating hydrodynamic pressure in a lubricant filled in said bearing clearance;
capillary sealing sections being provided at both ends of said bearing clearance which are made by tapering the space between said fixed member and said rotary member;
said lubricant being filled without interruption in the bearing clearance between said two capillary sealing sections, including said hydrodynamic bearing sections; and
each of said hydrodynamic bearing sections, of said at least two hydrodynamic bearing sections, at the outermost ends having hydrodynamic grooves configured in such a shape that a predetermined differential pressure to be applied in one direction in said hydrodynamic bearing clearance is generated in said lubricant, said lubricant pressurizing the bearing clearance between said both hydrodynamic bearing sections at the outermost ends while said differential pressure is canceled to be in equilibrium.

22. The hydrodynamic bearing apparatus as set forth in claim 21, wherein said fixed member is a shaft member, and said rotary member is a cylindrical member.

23. The hydrodynamic bearing apparatus as set forth in claim 21, wherein of said at least two hydrodynamic bearing sections, each of said hydrodynamic bearing sections at the outermost ends has hydrodynamic pressure grooves configured long so as to generate a differential pressure in said lubricant, to be applied to the bearing clearance between said both hydrodynamic bearing sections at outermost ends, and so that said lubricant pressurizes the bearing clearance between said both hydrodynamic bearing sections while said lubricant moves to one side of the bearing clearance determining the difference between said differential pressures as a predetermined differential pressure to be in equilibrium.

24. The hydrodynamic bearing apparatus as set forth in claim 23, wherein of said both capillary sealing sections, the capillary sealing section downstream in the lubricant's moving direction has a space capacity to allow the deviation of said lubricant due to its movement.

25. The hydrodynamic bearing apparatus as set forth in claim 21, wherein said hydrodynamic bearing sections comprises two radial bearing sections and two thrust bearing sections; of said four bearing sections, each of the hydrodynamic bearing sections at the outermost ends having hydrodynamic pressure grooves formed so as to generate a predetermined differential pressure in said lubricant, which is applied to the inner side of said bearing clearance; said grooves being formed in such a shape that said lubricant pressurizes said bearing clearance between said both hydrodynamic bearing sections at the outermost ends while said differential pressure is canceled to be in equilibrium.

26. The hydrodynamic bearing apparatus as set forth in claim 21, wherein said hydrodynamic pressure grooves which are exposed when said lubricant moves during rotation are formed on the fixed member side.

\* \* \* \* \*